United States Patent [19]
Zigmant

[11] 3,947,839
[45] Mar. 30, 1976

[54] TRAILER ANGULAR DIRECTION SENSOR AND INDICATOR

[76] Inventor: Frank Zigmant, 40436 - 20th St. West, Palmdale, Calif. 93550

[22] Filed: Jan. 31, 1975

[21] Appl. No.: 546,092

[52] U.S. Cl. .............................. 340/282; 340/52 R
[51] Int. Cl.² .................... G08B 21/00; B60Q 1/00
[58] Field of Search .................................... 340/282

[56] References Cited
UNITED STATES PATENTS

| | | | |
|---|---|---|---|
| 2,214,161 | 9/1940 | Cater | 340/282 |
| 3,237,177 | 2/1966 | Sparks et al. | 340/282 |

*Primary Examiner*—Glen R. Swann, III

[57] ABSTRACT

A system is disclosed herein for advising an operator of a towing vehicle of the relative angular position of a towed load such as a trailer with respect to the longitudinal centerline of the towing vehicle. The system includes a trailer tongue and ball hitch coupling device for interconnecting the towing vehicle with the trailer. The coupling device includes a rotary sensor for determining angular displacement of the trailer tongue with respect to the ball hitch and an electrical wiper arm device for converting the mechanically sensed displacement into an electrical signal for application to an operator warning indicator mounted on the dashboard. The indicator has a visual display of the relative angular position of the trailer with respect to the towing vehicle and further includes a dynamic indication of whether the angular relationship is increasing or decreasing.

4 Claims, 5 Drawing Figures

U.S. Patent  March 30, 1976  3,947,839
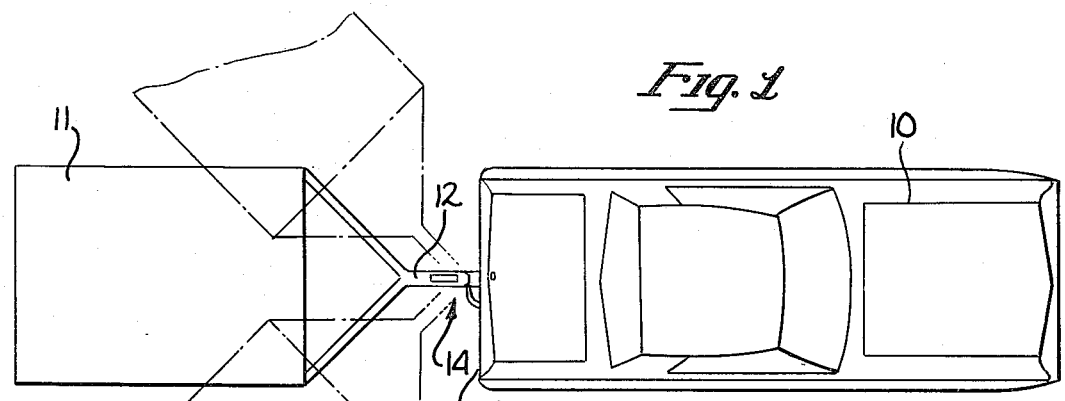
Fig. 1
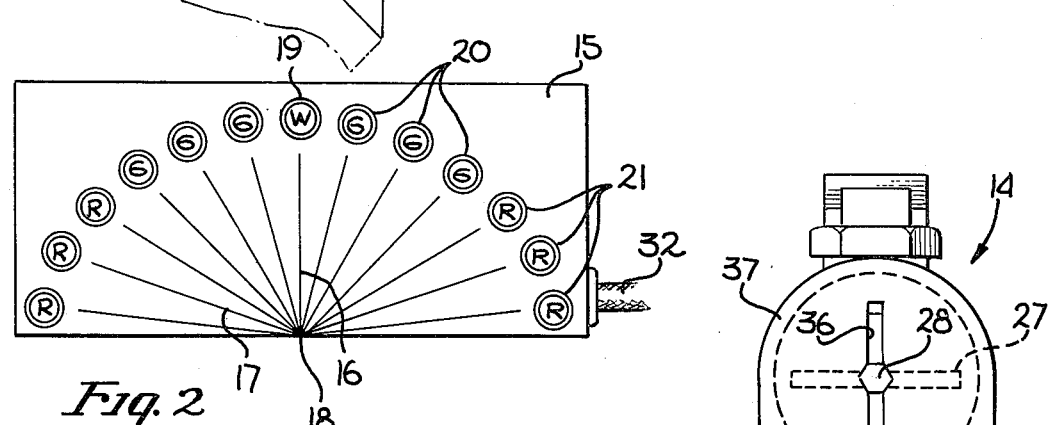
Fig. 2
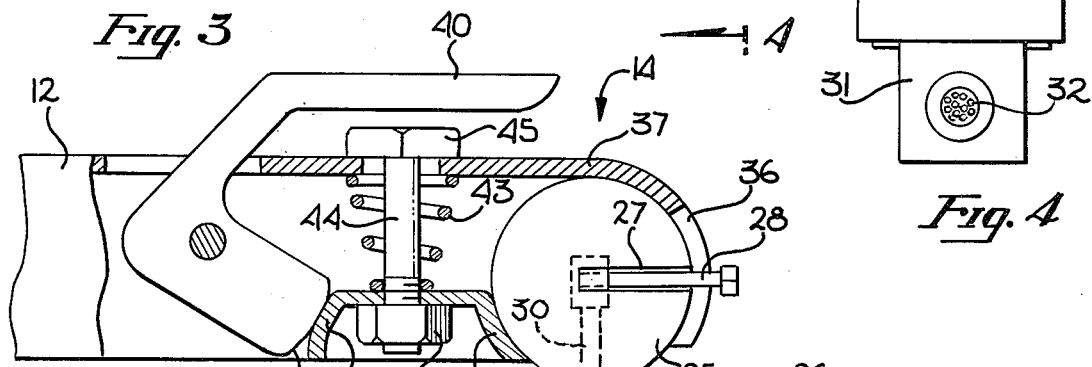
Fig. 3
Fig. 4
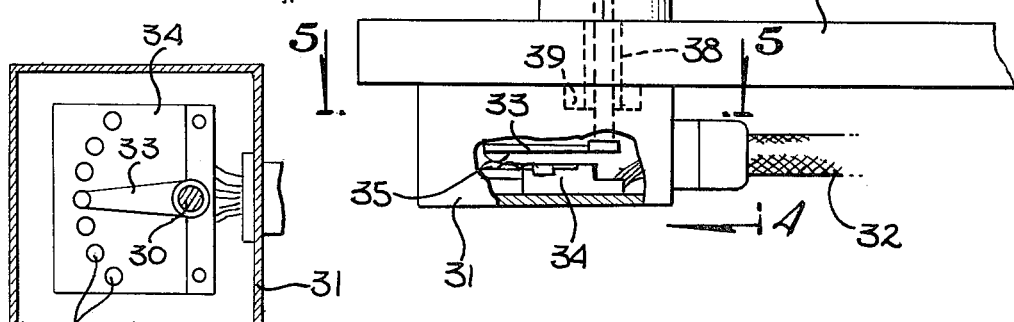
Fig. 5

TRAILER ANGULAR DIRECTION SENSOR AND INDICATOR

BACKGROUND OF THE INVENTION

This invention relates to signaling devices for trailer vehicles and more particularly to a novel angular direction or position sensor and indicator for alerting the vehicle operator to the angular displacement of the towing vehicle with respect to the towed load.

In the past, many situations have been encountered wherein the driver of a towing vehicle does not know the exact angular relationship of the towed load with respect to the towing vehicle. For example, it is frequently necessary to cause reverse movement of the trailer vehicle and the tow vehicle to move the trailer vehicle to a desired location. During the backing procedure, the towed load or trailer sometimes decreases the angular displacement between the vehicles and a condition known as "jack knife" is produced. Obviously, such a condition is undesirable and will cause damage to both trailer vehicles. Also, even when the towing vehicle is proceeding in a forward direction, it often happens that the trailer will fishtail causing unnecessary wear on the vehicles and particularly the tires. Again, this is a condition to be avoided.

Some attempts have been made to provide indicating devices for drawing the vehicle operator's attention to the fact that the trailing vehicle may be fishtailing or about to jack knife. Such prior attempts are disclosed in U.S. Pat. Nos. 3,605,088; 3,237,177 and 3,588,809. Although these devices have been operable for some of their objects, these devices do not indicate or display to the vehicle operator the direction of angular displacement during travel so that the operator can take corrective action. Also, these devices do not permit wide angular displacement up to 90° and these devices are not entirely successful for indicating to the operator angular displacements during the reversing or backing procedures. Some of the prior art devices are extremely complex and require substantial alteration of either the towing vehicle or the trailing vehicle.

Therefore, there has been a long standing need to provide a simple sensing device and indicator system for displaying direction of angular displacement as well as actual angular position of a trailing vehicle with respect to the towing vehicle.

SUMMARY OF THE INVENTION

Accordingly, the problems and difficulties encountered with prior art vehicle sensing devices are obviated by the present invention which provides a novel detecting and indicating system incorporating a rotatable mechanical element operably mounted within the ball of a ball hitch coupling mechanism and which is operated by the hitch component carried on the tongue of the trailer whereby angular movement of the trailer with respect to the towing vehicle is translated into rotary movement of the rotary element. An electrical detector means is connected to the rotary element which, in one form, includes a wiper arm and a multiplicity of electrical contacts arranged in a semi-circle so as to be contacted by the rotary element during rotation thereof. An indicator is connected to the wiper mechanism so as to receive the electrical signals therefrom for actuating a display to be observed by the vehicle operator. The display includes a plurality of lights arranged in a semi-circle and electrically connected so that two or three of the lights are illuminated to show direction of angular displacement.

Therefore, it is among the primary objects of the present invention to provide a novel warning system for a vehicle operator towing a load which not only indicates the angular position of the towed load but displays the direction of angular displacement of the load with respect to the centerline of the towing vehicle.

Another object of the present invention is to provide a novel detector and indicating system for displaying angular position and displacement of a trailer vehicle with respect to the towing vehicle.

Still another object of the present invention is to provide a novel indicator and display means for indicating angular position and displacement of a towed load which is incorporated into the interconnecting trailer hitch mechanism between the towed load and the towing vehicle.

A further object of the present invention is to provide a novel rotary detector and display system that may be incorporated into a conventional ball hitch coupling for indicating trailer angular displacement and direction which is economical to manufacture and easy to install.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

FIG. 1 is a top plan view of a towing vehicle connecting a trailer by means of a conventional ball hitch coupling;

FIG. 2 is a front plan view of the novel display for the system of the present invention;

FIG. 3 is a side elevational view, partly in sections, of the trailer hitch coupling incorporating the present invention; and FIG. 4 is a sectional view of the trailer hitch coupling as taken in the direction of arrows 4—4 of FIG. 3.

FIG. 5 is a transverse cross-sectional view taken in the direction of arrows 5—5 of FIG. 3.

DESCRIPTION OF THE PREFERRED EMBODIMENT

Referring to FIG. 1, an automobile 10 is employed as a towing vehicle for a load such as a trailer 11. The trailer 11 includes a draw bar 12 having a tongue on which is located a portion of a hitch coupling while the other portion of the hitch coupling is carried on a piece connected to the bumper 13 of the towing vehicle 10. The hitch coupling incorporating the sensor or detector of the present invention is indicated in the general direction of arrow 14 and as the conventional case serves as a pivot about which the trailer 11 can rotate with respect to the vehicle 10. For example, when the vehicle is backing or proceeding in a reverse direction, the trailer 11 may angle to the right or left of the centerline of the vehicle 10 as indicated in broken lines. Obviously, this is a disadvantage since the angular displacement of the trailer with respect to the towing vehicle centerline can cause jack kniving which damages both trailer and towing vehicle. However, it is to be understood that in some instances it is desired by the vehicle operator to position the trailer in such angular displacement and in such circumstances, the driver must be skillful in rotating the front wheels of the vehicle 10 in order to gain the proper angular displacement desired. In this instance, the device of present invention is extremely helpful and the indicator therefore is shown in FIG. 2.

With respect to FIG. 2, the indicator is identified by numeral 15 and includes a display of lights arranged in a semi-circle throughout approximately 180°. Preferably, the indicator 15 is located on the dashboard in full view of the vehicle operator. A line 16 represents the longitudinal centerline of the towing vehicle 10 while other lines, such as line 17, are angularly disposed with respect to the centerline 16 in a radiating fashion from a center 18. The angular line 17 extends from the center point 18 at one end to a light at its opposite end and each of the lights is of a selected color. For example, the light at the end of the centerline 16 may be white indicating that the trailing vehicle 11 is on the centerline with the towing vehicle 10. However, when the vehicle is at an angular displacement with respect to the vehicle 10 centerline, green light 20 may be lit and when an extreme angular displacement is encountered, red light 21 may be lit. It is also to be understood that the direction of angular displacement is placed on display by the indicator 15 in that at least two of the lights are lit at all times. When three lights are lit, the indication of angular displacement with respect to direction is indicated. For example, if the angle between the trailer and the towing vehicle is decreasing so that the trailer is drawing closer to the rear end of the towing vehicle, the green light will turn in the direction of the red light so that the observer will know that the angle is decreasing. However, when the vehicle being towed is increasing its angular displacement so that is in the direction of solid lines in FIG. 1, the red light will extinguish and the green light will come on. As the direction of the trailer changes, it can happen that perhaps one red light will be on and two green and the next instance three greens will be on and then as the trailer approaches extension on the centerline of the vehicle 10, two green lights and one white light until finally the two green lights on opposite sides of the white light will be lit and the driver will know that the vehicle is directly behind him.

Referring now in detail to FIG. 3, the novel hitch coupling 14 of the present invention includes a ball 25 fixedly secured to a piece 26 rearwardly extending from the bumper or other structural support of the towing vehicle 10. The ball is formed with a horizontal slot 27 through which a pin 28 travels in a semi-circular direction. The pin is cantilevered outwardly from a shaft 30 that is rotatably mounted through the ball 25 and extends downwardly through a piece 26 into a wiper switch box 31. The wiper arm switch box 31 is connected to the display indicator 15 via cable 32. It is understood that electrical power for operating the light display on indicator 15 is supplied from the 12 volt battery supply incorporated into the ignition and lighting of the towing vehicle 10. The cabling system 32 is electrically connected to a wiper arm 33 carried on the end of rotating shaft 30 as illustrated in FIG. 3. The extreme end of the contact arm 33 includes a contact button which engages with a semi-circular contact bar 34 which includes a plurality of fixed spaced-apart contacts such as is indicated by contacts 35. The spacing between the fixed contacts is such that the physical dimension equals the distance between the light 20 and 21 carried on the display surface of the indicator 15.

As the draw bar 12 moves either to the right or left of the ball hitch, the arm 28, which projects through a vertical slot 36 formed in the end of the ball coupling unit 37 causes the arm to move to the left or right following the angular movement of the trailing vehicle. The arm 28 is permitted to move in the horizontal plane by means of slot 27 formed in the ball 25. The opposing edges of the vertical slot 36 engage with the side of arm 28 and therefore cause the arm to move accordingly. As the arm moves, rotation is transferred to wiper arm 33 via the rotatably mounted shaft 30. Shaft 30 is, in one form, rotatably carried in a mounting sleeve 38 which includes a nut or collar 39 for securing the shaft and sleeve in place. In order to prevent any binding when the trailing vehicle 11 is in a different vertical attitude from that of the towing vehicle 10, the arm 28 will permit vertical angular displacement of the draw bar ball receiving end 37 to move over the ball 25 while the arm 28 dos not engage with the coupling member 37. However, any horizontal angular displacement of the draw bar with respect to the ball will be reflected in a rotational movement of arm 28, shaft 30 and a corresponding rotational movement of contact arm 33 over the electrical contacts 35.

The trailer hitch 14 includes a releasable mechanism for interconnectiing the ball 25 with portion 37 of the draw bar 12. The releasable mechanism includes a conventional pivotal handle 40 having a cam 41 which operates against an element 42 which includes a semi-circular portion corresponding to the sphere or ball 25. The handle 40 when pivoted so that the cam 41 engages the elements 42, forces the elements into engagement with the ball 25. A spring 43 maintains a resilient bias to element 42 and the spring is compressed between the underside of portion 37 of draw bar 12 and the upperside of the element 42. The piece 42 is slidably carried on a bolt 44 which is carried on portion 37 by a nut 45 and the opposite end of shaft or bolt 44 includes a nut 46 which is on the opposite side of element 42 from the side against which spring 43 is biased. It is to be understood that the release for lock mechanism does not form a part of the present invention and that any other form of releasable coupling or lock mechanism may be employed.

Therefore, it can be seen that when the vehicle 10 is towing a trailer 11 and the trailer is on the centerline of the vehicle 10, the white display light 19 on indicator 15 will be illuminated and, the adjacent green light may also be illuminated. Should the trailer 11 start to fishtail or otherwise move to the right or the left of the centerline, the white light will extinguish and the green light will be illuminated. Also, should the vehicle 10 be backed up or reversed and should the trailer 11 be angularly displaced to the right or left of the centerline the display lights will also indicate the angle and direction of displacement. As the portion 37 of draw bar 12 moves, arm 28 will engage with the opposite sides of slot 36 and the arm will move in a following manner through slot 27. Any vertical movement of the draw bar 12 will cause the arm 28 to move in the vertical slot 36. Rotating movement of arm 28 is translated into rotary contact arm 33 movement and such will cause illumination of the respective lights. The device is simple to install and requires minimal alteration of component parts for modification to incorporate the detector and display unit of the present invention. The portion 37 represents a fork member having slot 36 for receiving the sensing arm 28 therein. In this manner, angular movement or displacement of the draw bar with reference to the towing vehicle is reflected in angular displacement of the arm and ball of the hitch.

A feature of the invention resides in displaying the direction of angular displacement. This is achieved by constructing the width of the rotary wiper contact 33 equal to the width of one fixed contact 35 plus approximately 2½ times the width of space between or separating adjacent fixed contacts. Also, audible alarm means may be incorporated as well as visual.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A trailer angular direction indicator comprising the combination of:
   a releasable hitching device interconnecting the rear of a towing vehicle with the draw bar of a trailer;
   a sensing means operably connected on said hitching device for detecting angular displacement of said trailer with respect to said towing vehicle;
   an indicator means operably connected to said sensing means including display means for presenting a visual indication of said angular displacement and the direction of said angular displacement with reference to increasing and decreasing of said angular displacement;
   wherein said sensing means includes: a sensing arm rotatably carried on said towing vehicle;
   a portion fixedly carried on the draw bar of said trailer insertably receiving said sensing arm in a slot of said portion so that said sensing arm follows the said angular displacement of said trailer with respect to said towing vehicle;
   said sensing means further includes a wiper contact arm carried on said sensing arm and a plurality of wiper contacts fixed with respect to said wiper contact arm whereby the width of the contact carried on said wiper arm is at least equal to the width of one fixed contact plus approximately two and one half times the width of space separating adjacent ones of said fixed contacts;
   said indicator means includes a plurality of lights whereby a centermost light represents coextensive centerlines of said trailer and said towing vehicle;
   said hitching device includes a ball carried on said towing vehicle and said sensing arm is rotatably carried thereon; and
   said ball includes a horizontal slot for accommodating rotation of said sensing arm.

2. The invention as defined in claim 1 wherein said fork member includes a vertical slot formed therein permitting said draw bar to rotate on said ball about either vertical or horizontal axis.

3. A trailer angular direction indicator comprising the combination of:
   a releasable hitching device interconnecting the rear of a towing vehicle with the draw bar of a trailer;
   a sensing means operably connected on said hitching device for detecting angular displacement of said trailer with respect to said towing vehicle;
   an indicator means operably connected to said sensing means including display means for presenting a visual indication of said angular displacement and the direction of said angular displacement with reference to increasing and decreasing of said angular displacement;
   wherein said hitching device includes:
   a ball carried on said towing vehicle;
   a coupler carried on said draw bar for attachable connection with said ball;
   said sensing means including a rotatable arm carried on said ball;
   said ball having a horizontal slot and said coupler having a vertical slot;
   said arm projecting through said horizontal slot for rotation about a vertical axis and projecting through said vertical slot for rotation about a horizontal axis; and
   said indicator means including a display of lights arranged in a semi-circle wherein a centermost light represents coextensive alignment of center lines of said towing vehicle and said trailer and having scribed lines of equal length radiating in a converging manner from each of said lights to a center point in spaced relationship to said centermost light.

4. The invention as defined in claim 3 wherein the placement of said indicator means is on the dashboard of said towing vehicle immediately to the front of the operator whereby said center point represents said hitching device about which said trailer pivots.

* * * * *